(12) United States Patent
Davis

(10) Patent No.: US 8,623,480 B2
(45) Date of Patent: Jan. 7, 2014

(54) HOT MELT ADHESIVE COMPOSITIONS INCLUDING OLEFINIC POLYMER BLENDS AND ARTICLES INCLUDING THE SAME

(75) Inventor: Kevin Davis, North Saint Paul, MN (US)

(73) Assignee: H. B. Fuller Company, St. Paul, MN (US)

( * ) Notice: Subject to any disclaimer, the term of this patent is extended or adjusted under 35 U.S.C. 154(b) by 316 days.

(21) Appl. No.: 13/169,540

(22) Filed: Jun. 27, 2011

(65) Prior Publication Data

US 2012/0328805 A1     Dec. 27, 2012

(51) Int. Cl.
| | | |
|---|---|---|
| *B29D 22/00* | (2006.01) | |
| *B29D 23/00* | (2006.01) | |
| *B32B 1/08* | (2006.01) | |
| *B32B 27/32* | (2006.01) | |

(52) U.S. Cl.
USPC .......... 428/35.2; 524/528; 524/481; 524/112; 156/334

(58) Field of Classification Search
USPC ........... 428/35.2; 524/528, 481, 112; 156/334
See application file for complete search history.

(56) References Cited

U.S. PATENT DOCUMENTS

| | | | |
|---|---|---|---|
| 4,112,208 | A | 9/1978 | McConnell et al. |
| 4,120,916 | A | 10/1978 | Meyer et al. |
| 5,185,398 | A | 2/1993 | Kehr et al. |
| 6,653,385 | B2 | 11/2003 | Wang et al. |
| 6,747,114 | B2 | 6/2004 | Karandinos et al. |
| 7,700,707 | B2 | 4/2010 | Abhari et al. |
| 2009/0203847 | A1 | 8/2009 | Ellis et al. |
| 2010/0132886 | A1 | 6/2010 | Rodriguez et al. |
| 2010/0305259 | A1 | 12/2010 | Rodriguez et al. |

FOREIGN PATENT DOCUMENTS

| | | |
|---|---|---|
| WO | WO2005/111132 | 11/2005 |
| WO | WO2011/022523 | 2/2011 |

*Primary Examiner* — Michael C Miggins
(74) *Attorney, Agent, or Firm* — Kristi Halloran; Kirsten Stone

(57) ABSTRACT

A hot melt adhesive composition that includes a non functionalized amorphous poly alpha olefin polymer, a second polymer selected from the group including polypropylene homopolymers, polypropylene copolymers and combinations there of, a functionalized wax and a second wax.

20 Claims, No Drawings

HOT MELT ADHESIVE COMPOSITIONS INCLUDING OLEFINIC POLYMER BLENDS AND ARTICLES INCLUDING THE SAME

BACKGROUND

The invention is directed to a hot melt adhesive composition that includes a non functionalized amorphous poly alpha olefin polymer, a second polymer selected from the group including polypropylene homopolymers, polypropylene copolymers and combinations there of, a functionalized wax and a second wax.

Hot melt adhesives are often used to bond to substrates together so as to maintain the two substrates in a fixed relation to each other.

In one application, hot melt adhesives are used to adhere packaging constructions e.g. bag, box, carton, case and tray together to construct the package, close the package or both. In applications such as these, it is important that the hot melt forms a strong bond that can result in fiber failure when pulled apart at temperatures from about −28.9° C. (−20° F.) to about 65.6° C. (150° F.).

SUMMARY

In one aspect, the invention features a hot melt adhesive composition including at least 55% by weight of a first polymer consisting of a non functionalized amorphous poly alpha olefin polymer comprising greater than about 50% by weight polypropylene, a second polymer selected from the group consisting of polypropylene homopolymers, propylene copolymers, and combinations thereof, functionalized polypropylene wax, and polyethylene wax, the adhesive composition having a viscosity of no greater than 2000 centipoise at 176.7° C.

In one embodiment, the non functionalized amorphous poly alpha olefin polymer has a viscosity of no greater than about 5,000 cps at 190° C. In another embodiment, the non functionalized amorphous poly alpha olefin polymer has a viscosity of no greater than about 750 cps at 190° C. In other embodiments, the non functionalized amorphous poly alpha olefin polymer has a polydispersity of no less than about 4. In some embodiments, the non functionalized amorphous poly alpha olefin polymer has a Mw of no greater than or equal to about 30,000.

In one embodiment, the second polymer is metallocene catalyzed. In another embodiment, the second polymer has a polydispersity no greater than about 3. In other embodiments, the polyethylene wax has a density of at least about 0.92. In another embodiment, the functionalized polypropylene wax consists of maleic anhydride functionalized polypropylene wax.

In one embodiment, the adhesive composition is free of a tackifying agent. In another embodiment, the tackifying agent is present at no greater than about 15% by weight. In some embodiments, the composition exhibits at least 50% fiber tear at −20° F. and at 150° F.

In another aspect, hot melt adhesive composition includes at least 55% by weight of a first polymer consisting of a non functionalized amorphous poly alpha olefin polymer comprising greater than about 50% by weight polypropylene having a viscosity at 190° C. of not more than 1500 cps, a second polymer selected from the group consisting of polypropylene homopolymers, propylene copolymers, and combinations thereof, a functionalized wax and a second wax. In one embodiment, the second polymer has a polydispersity of no greater than about 3. In another embodiment, the functionalized wax is a polyethylene wax. In some embodiments, the functionalized wax is a maleated wax.

In another aspect, the invention includes a method of making a construction, the method including applying a hot melt adhesive composition including at least 55% by weight of a first polymer consisting of a non functionalized amorphous poly alpha olefin polymer comprising greater than about 50% by weight polypropylene, a second polymer selected from the group consisting of polypropylene homopolymers, propylene copolymers, and combinations thereof, a functionalized polypropylene wax and polyethylene wax; on a surface of a first substrate; and contacting the applied adhesive composition with a second substrate such that the first substrate is bonded to the second through the adhesive composition and the adhesive composition exhibits at least 60% fiber tear at −20° F. In one embodiment, at least one of the first and second substrates comprise at least one of paperboard, corrugated paperboard, cardboard, and coated cardboard. In another embodiment, the construction is a packaging construction being in a form selected from the group consisting of bag, box, carton, case and tray.

In some embodiments, the hot melt adhesive forms a strong bond that can result in fiber failure across a wide temperature range.

Other features and advantages will be apparent from the following description of the preferred embodiments and from the claims.

DETAILED DESCRIPTION

The hot melt adhesive composition of this invention includes a non functionalized amorphous poly alpha olefin comprising greater than about 50 weight % polypropylene, a second polymer selected from the group consisting of polypropylene homopolymers, polypropylene copolymers and combinations thereof, a functionalized wax and a second wax.

For purposes of this invention the following terms are defined as set forth below.

By non functionalized it is meant that the polymer has not been contacted with an unsaturated monomer (i.e., a functional group) such as e.g. carboxylic acids, dicarboxylic acids, organic esters, organic anhydrides, organic alcohols, organic acid halides, organic peroxides, amides, and imides.

By functionalized it is meant that the polymer has been contacted with at least one unsaturated monomer (i.e., a functional groups) such as e.g. carboxylic acid, dicarboxylic acid, organic ester, organic anhydride, organic alcohol, organic acid halide, organic peroxide, amide, and imide.

By metallocene catalyzed it is meant that the polymer is polymerized by use of one or more metallocene catalysts.

Non Functionalized Amorphous Poly Alpha Olefin

The composition includes a non functionalized amorphous poly alpha olefin (APAO). APAO is a polymer of one or more alpha olefins (e.g. ethylene, propylene, 1-butene, etc.). APAO can be a homopolymer, copolymer or terpolymer. APAO can be manufactured by use of heterogeneous stereospecific polymerization using Ziegler-Natta technology. Such methods are well known in the art and include those methods disclosed in U.S. Pat. No. 4,859,757, U.S. Pat. No. 4,847,340, U.S. Pat. No. 4,736,002 and U.S. Pat. No. 5,714,554.

The non functionalized APAO is a homopolymer or copolymer of propylene. In some embodiments, the non functionalized APAO comprises greater than or equal to about 50% by weight of propylene, about 60% by weight propylene, or even about 70% by weight propylene.

In some embodiments, the non functionalized APAO polymer includes from about 2 weight % to about 50 weight % or from about 2 weight % to about 25 weight % of units derived from at least one additional C2 or C4-C10 alpha olefin.

In other embodiments, the non functionalized APAO is a copolymer of polypropylene with at least one other monomer selected from the group including ethylene, butene, hexene and octene.

The non functionalized APAO can have a viscosity of no greater than about 5,000 cps, no greater than about 3,000 cps, no greater than about 2,000 cps, no greater than about 1,500 cps, no greater than about 1,000 cps, or even no greater than about 750 cps when tested at 190° C.

The non functionalized APAO can have a Mw of no greater than about 40,000, no greater than about 30,000, no greater than about 20,000, from about 10,000 to about 40,000, or even from about 15,000 to about 30,000.

The non functionalized APAO can have a polydispersity index (Mw/Mn) of at least about 4, least about 5, or even at least about 7.

The non functionalized APAO is present in the composition in at least about 50% by weight, at least about 55% by weight, at least 55% by weight, at least about 60% by weight, at least about 65% by weight, at least about 70% by weight, at least about 75% by weight, from about 50% by weight to about 90% by weight, from about 60% by weight to about 85% by weight, or even from about 70% by weight to about 85% by weight.

Useful non functional APAOs are commercially available from a number of sources including REXTAC 2715 and REXTAC 2304 available from REXtac LLC (Odessa, Tex.), EASTOFLEX 1016 available from Eastman Chemical Company (Kingsport, Tenn.) and VESTOPLAST EP NC 702 available from Evonik Industries (Marl, Germany).

Second Polymer

The composition includes a second polymer selected from the group including polypropylene homopolymers, polypropylene copolymers and combinations thereof.

The second polymer can be a metallocene catalyzed polymer. The metallocene catalyzed polymer can be linear or substantially linear and can further be homogeneous. The term "homogeneous" as used in reference to the polymer means that the comonomer units when present in the interpolymer are randomly distributed within a given interpolymer molecule and substantially all the interpolymer molecules have the same comonomer ratio within that interpolymer. Methods of making metallocene catalyzed polymers are well known in the art and include those methods disclosed in U.S. Pat. No. 5,272,236, U.S. Pat. No. 5,278,272, U.S. Pat. No. 4,937,299, and U.S. Pat. No. 5,218,071, and incorporated herein.

The second polymer can be derived from one or more olefin monomers including e.g. C2 to C10 olefins. In one embodiment, the second polymer is a metallocene catalyzed polymer including greater than 50 weight % polypropylene. In one embodiment the second polymer is a copolymer of polypropylene with at least one monomer selected from the group including C2 olefins and C4-C10 olefins.

The second polymer preferably has a polydispersity index (Mw/Mn) of no greater than about 3.5, from about 1 to about 3.5, or even from 1.5 to 2.5.

Possible second polymers are commercially available from a number of sources including VISTAMAXX 6202, a polypropylene ethylene copolymer available from Exxon-Mobil Chemical Company (Houston, Tex.); LICOCENE 2602, a polypropylene homopolymer available from Clariant International Ltd (Muttenz, Switzerland), and the ENGAGE series of trade designations including e.g. EG 8200, a ethylene octene copolymer available from the Dow Chemical Company (Midland, Mich.).

The second polymer is present at no greater than about 20 weight %, no greater than about 15 weight %, no greater than about 10 weight %, at least about 3%, at least about 5 weight %, from about 3 weight % to about 20 weight %, or even from about 5 weight % to about 15 weight %.

Functionalized Wax

The composition includes a functionalized wax. The wax can be functionalized with unsaturated monomers (i.e., functional groups) such as carboxylic acids, dicarboxylic acids, organic esters, organic anhydrides, organic alcohols, organic acid halides (such as acid chlorides, acid bromides, etc.), organic peroxides, amides, and imides and include, for example, maleic, fumaric, acrylic, methacrylic, itaconic, crotonic, alpha methyl crotonic, and cinnamic acids as well as their anhydrides, esters and salt derivatives; vinyl acetate; N-phenylmaleimide; and unsaturated hydroxyl-containing compounds such as hydroxyethyl methacrylate, hydroxypropyl methacrylate, allyl alcohol and bis(hydroxyethyl)maleate; unsaturated epoxy group-containing compounds such as glycidyl methacrylate; unsaturated amide group-containing monomers such as acrylamide, methacrylamide and alkoxy-substituted amides such as N-butoxymethylacrylamide and N-ethoxymethylmethacrylamide; and nitriles such as acrylonitrile and methacrylonitrile.

The funetionalized wax can be a polypropylene or a polyethylene wax. In a preferred embodiment, the wax is a functionalized polypropylene wax. In another embodiment, the wax is functionalized with maleic anhydride and is known as a maleated wax.

Possible functionalized polypropylene waxes include A-C 596, a maleated polypropylene wax available from Honeywell International Incorporated (Morristown, N.J.) and TP LICOCENE PP MA 6252, a maleated polypropylene available from Clariant International Ltd. (Muttenz, Switzerland).

The functionalized wax is present in the composition at no greater than about 25% by weight, no greater than about 15% by weight, no greater than about 10% by weight, no greater than about 5% by weight, between about 2% by weight and about 25% by weight, or even between about 2% by weight and about 10% by weight.

Second Wax

The composition includes a second wax. Useful classes of second waxes include, e.g., paraffin waxes, microcrystalline waxes, high density low molecular weight polyethylene waxes, by-product polyethylene waxes, Fischer-Tropsch waxes, oxidized Fischer-Tropsch waxes, functionalized waxes such as acid, anhydride, and hydroxy modified polyethylene waxes, animal waxes, vegetable waxes (e.g. soy wax) and combinations thereof. Useful waxes are solid at room temperature and preferably have a Ring and Ball softening point of from 50° C. to 150° C. Useful low molecular weight polyethylene waxes include (i.e., polyethylene having a molecular weight (Mw) from 500 to 10,000) and an ASTM softening point of from about 65° C. to about 120° C. Useful paraffin waxes have a melting, point of from about 50° C. to about 80° C. Useful microcrystalline waxes have a melting point of from about 55° C. to 95° C. as determined by ASTM method D127-60.

In a preferred embodiment, the second wax is a polyethylene wax. The second wax can be non-functionalized. Alternately, the second wax is functionalized.

The second wax can have a density of at least about 0.92, or even at least 0.92, or even between about 0.92 and 0.95.

Possible second waxes include EPOLENE N-21, a high-density low molecular weight polyethylene wax available from Westlake Chemical Corporation (Houston, Tex.).

The second wax is present in the composition at from about 1 weight % to about 35 weight %, from about 3 weight % to about 25 weight %, from about 5 weight % to about 20 weight %, or even no less than about 5 weight %.

Tackifying Agent

The compositions can be free of a tackifying agent. Optionally, the compositions can include a tackifying agent. Useful tackifying agents for inclusion in the hot melt adhesive composition include, e.g., natural and modified rosin (e.g., gum rosin, wood rosin, tall-oil rosin, distilled rosin, hydrogenated rosin, dimerized rosin and polymerized rosin), glycerol and pentaerythritol esters of natural and modified rosins (e.g., glycerol ester of pale wood rosin, glycerol ester of hydrogenated rosin, glycerol ester of polymerized rosin, pentaerythritol ester of pale wood rosin, pentaerythritol ester of hydrogenated rosin, pentaerythritol ester of tall oil rosin and the phenolic modified pentaerythritol ester of rosin), polyterpene resins having a softening point, as determined by ASTM method E28-58T, of from about 10° C. to 140° C. and hydrogenated polyterpene resins, copolymers and terpolymers of natural terpenes (e.g. styrene-terpene, alpha-methyl styrene-terpene and vinyl toluene-terpene), aliphatic and cycloaliphatic petroleum hydrocarbon resins having Ring and Ball softening points of from about 10° C. to 140° C. (e.g., branched and unbranched $C_5$ resins, $C_9$ resins, and $C_{10}$ resins), aromatic petroleum hydrocarbons and the hydrogenated derivatives thereof, aliphatic/aromatic petroleum derived hydrocarbons and the hydrogen ated derivatives thereof, and combinations thereof.

A number of useful tackifying agents are commercially available from a variety of sources including, e.g., ESCOREZ 5400 and ESCOREZ 5415 dicyclopentadiene from Exxon-Mobil Chemical (Houston, Tex.), and EASTOTAC H130W aliphatic hydrocarbon resin and EASTOTAC H-100L hydrogenated $C_5$ aliphatic hydrocarbon tackifying resin, both of which are available from Eastman Chemical Company (Kingsport, Tenn.). The tackifying agent can be present in the hot melt adhesive composition in an amount of from about 5% by weight to about 40% by weight, from about 5% to about 30% by weight, no greater than about 30% by weight, no greater than about 20% by weight, no greater than about 15% by weight, no greater than about 10% by weight, or no greater than about 8% by weight, or even no greater than about 5% by weight.

Other Components

The hot melt adhesive composition optionally includes other components including, e.g., other polymers (e.g., high density polyethylene, linear low density polyethylene, nonmetallocene catalyzed linear low density polyethylene, metallocene catalyzed polyolefins, block copolymers (e.g., styrene-ethylene-butadiene-styrene block copolymer), and combinations thereof, stabilizers, antioxidants, pigments, dyes, ultraviolet light absorbers, flame retardants, fillers, and combinations thereof. Useful antioxidants include high molecular weight hindered phenols and multifunctional phenols. Suitable antioxidants are commercially available under a variety of trade designations including, e.g., the IRGANOX series of trade designations including, e.g., IRGANOX 1010, IRGANOX 565, and IRGANOX 1076 hindered phenolic antioxidants, and the trade designation IRGAFOS 168 phosphite antioxidant all of which are available from BASF Corporation (Florham Park, N.J.), the BNX series of trade designations, including, e.g., BXN 1010 from Mayzo, Inc. (Norcross, Ga.), the CYANOX LTDP trade designation from Cytec Industries (Stamford, Conn.), the ETHANOX 330 trade designation from Albemarle Corp. (Baton Rouge, La.) and the EVERNOX 76 trade designation from Everspring Corporation (Santa Monica, Calif.). The hot melt adhesive composition includes from about 0% by weight to about 2.0% by weight or even from about 0.1% to about 1.0% by weight antioxidant.

Useful stabilizers include phosphites, such as tris-(p-nonylphenyl)-phosphite (TNPP) and bis(2,4-di-tert-butylphenyl) 4,4'-diphenylene-diphosphonite and di-stearyl-3,3'-thiodipropionate (DSTDP).

Packaging

The adhesives of this invention can be useful in a method of making a construction including e.g. a packaging construction—to assemble the construction, close the construction or both. A method of making a construction can include applying the hot melt adhesive on a surface of a first substrate, contacting the hot melt adhesive with a second substrate, such that the first substrate is bonded to the second through the adhesive composition and the adhesive composition exhibits a fiber tearing bond to the first and second substrate. Possible packaging constructions include e.g. bags, boxes, cartons and cases. Possible substrates include, polymer films, metalized polymer films, paperboard, cardboard, coated cardboard, fiber board, virgin and recycled kraft, high and low density kraft, chipboard, various types of treated and coated kraft and chipboard, and corrugated versions of the same, clay coated chipboard, carton stock, composites and combinations thereof.

Useful composites include, e.g., chipboard laminated to metal foil (e.g., aluminum foil), which is optionally laminated to one or more layers of polymer film. Alternatively or in addition, the film is optionally bonded directly to chipboard, kraft and combinations thereof.

The adhesive composition can exhibit fiber failure when tested at −28.9° C. (−20° F.) of no less than about 40%, no less than about 50%, or even no less than about 60%.

The adhesive composition can exhibit fiber failure when tested at 4.4° C. (40° F.) of no less than about 40%, no less than about 50%, or even no less than about 60%.

The adhesive composition can exhibit fiber failure when tested at 48.9° C. (120° F.) of no less than about 40%, no less than about 50%, or even no less than about 60%.

The adhesive composition can exhibit fiber failure when tested at 65.6° C. (150° F.) of no less than about 40%, no less than about 50%, or even no less than about 60%.

The adhesive composition can have a viscosity of no greater than about 2,000 cps, no greater than about 1,500 cps, no greater than about 1,300 cps, or even no greater than 1,000 cps when tested and 176.7° C. (350° F.).

Manufacturing and Application

Useful methods of making the hot melt adhesive composition include, e.g., continuous processes and batch processes.

The adhesive can be applied to a substrate in any useful form including, e.g., as a continuous coating, a discontinuous coating, in a pattern, randomly, and combinations thereof, using any suitable application method including, e.g., slot coating, spray coating (e.g., spiral spray and random fiberization (e.g., melt blowing)), extrusion (e.g., applying a bead, and fine line extrusion), wheel application, noncontact coating, contacting coating, gravure, roll coating, transfer coating, and combinations thereof.

The adhesive compositions of this invention may also be useful in the manufacture of disposable articles including, e.g., medical drapes, medical gowns, sheets, feminine hygiene articles, diapers, adult incontinence articles, absorbent pads (e.g., for animal pads (e.g., pet pads) and humans (e.g., bodies and corpses)). The adhesive compositions of this invention may further be useful in book binding, foam bonding, heat sealing applications, carpet sealing, bag end sealing, bonding filter media, insulation bonding, durable goods manufacturing (e.g., shoes and other athletic gear), wood working, construction, automotive applications, appliance applications, assembly applications (e.g., filter media, insulation, and bonding)

The invention will now be described by way of the following examples.

EXAMPLES

Test Procedures

Test procedures used in the examples include the following. All ratios and percentages are by weight unless otherwise indicated.

Viscosity

Viscosity is determined in accordance with ASTM D-3236 entitled. "Standard Test Method for Apparent Viscosity of Hot Melt Adhesives and Coating Materials," (Oct. 31, 1988). Melt viscosities are determined on a Brookfield Thermoset Viscometer Model LVDV 2+ using an appropriate spindle, and reported in centipoise ("cps").

Fiber Tear Test Method

Fiber tear measures the percentage of fiber that covers the area of the adhesive after two substrates, which have been previously bonded together through the adhesive, are separated by force. The percentage of fiber tear is determined as follows. A bead of adhesive composition measuring 15.24 cm (6 inch)×0.24 cm (3/32 inch) is applied to a first substrate of Inland high performance 57 pound 100% virgin liner board, using a Waldorf bond simulator at the specified application temperature. Two seconds after the bead of adhesive is applied to the first substrate, the bead of adhesive is contacted with a second substrate of Inland high performance 57 pound 100% virgin liner board, which is pressed against the adhesive and the first substrate with a pressure of 0.21 Mpa (30 pounds per square inch (psi)) for a period of 2 seconds. The resulting construction is then conditioned at the specified test temperature for at least 24 hours, and then the substrates of the construction are separated from one another by pulling the two substrates apart from one another by hand. The surface of the adhesive composition is observed and the percent of the surface area of the adhesive composition that is covered by fibers is determined and recorded. A minimum of six samples are prepared and tested for each hot melt adhesive composition.

Set Time Test Method

A bond is made as described in the Fiber Tear Test Method above. A timer is started as the bead is applied to the first substrate. When the timer is at 5 seconds, the now formed bond is pulled apart. If the bond results in less than 100% fiber failure, another bond is made and pulled after 5.5 seconds. In this manner, one continues to increase the time, prior to pulling the bond, in 0.5 second increments until the set time is arrived upon. The set time is the shortest amount of time in which a pulled bond results in 100% fiber failure. Once a time is arrived upon, the test is repeated once to confirm the result. If the bond gives 100% fiber failure at 5 seconds, the set time is recorded as no greater than about 5 seconds.

Preparation of Control 1 and Examples 1-3

The REXTAC RT 2304, AC-596 or AC-597, EPOLENE N-21 and antioxidants were placed in metal can and heated in an oven at 176.7° C. (350° F.) for about 1 hour. The can was removed from the oven and placed in a heating mantle (e.g. Glas-Col, Terre Haute, Ind.) which maintained the temperature of the composition at around 176.7° C. The composition was mixed with an upright Stirrer Type RZRI mixer (e.g. Caframo, Wiarton, Ontario, Canada). Once homogeneous, the LICOCENE 2602 or VISTAMAXX 6202 was added slowly with mixing. Once the LICOCENE 2602 or VISTAMAXX 6202 were completely added, the mixture was blended until smooth and uniform, about ½ hour.

Materials

REXTAC RT 2304—Polypropylene ethylene APAO having a viscosity of 450 cp at 190° C.
LICOCENE 2602—Metallocene catalyzed polypropylene homopolymer
VISTAMAXX 6202—Metallocene catalyzed polypropylene ethylene copolymer
A-C 596—Maleated polypropylene wax, saponification number: 40 to 55 mg KOH/g (Honeywell test method 357-OR-1)
A-C 597—Maleated polypropylene wax, saponification number: 70 to 95 mg KOH/g (Honeywell test method 357-OR-1)
EPOLENE N-21—Polyethylene wax
IRGANOX 1010—Antioxidant
IRGAFOS 168—Antioxidant Control 1 and Examples 1-3 were tested according to the Viscosity, Set Time and Fiber Tear test methods. The results are set forth below in Table 1.

TABLE 1

| Sample | Control 1 | Example 1 | Example 2 | Example 3 |
|---|---|---|---|---|
| REXTAC RT 2304 | 76.5 | 81.5 | 81.5 | 81.5 |
| VISTAMAX 6202 | | 5 | 5 | |
| LICOCENE 2602 | | | | 5 |
| A-C 596 | | 2 | 5 | 5 |
| A-C 597 | 2 | | | |
| EPOLENE N-21 | 20 | 10 | 7 | 7 |
| IRGANOX 1010 | 0.5 | 0.5 | 0.5 | 0.5 |
| IRGAFOS 168 | 1.0 | 1.0 | 1.0 | 1.0 |
| Viscosity at 176.7° C. (350° F.) (cps) | 495 | 885 | 1217 | 628 |
| Set time (second) | 6.5 | 6 | 5.5 | 6 |
| Fiber Tear at −28.9° C. (−20° F.) | 12 | 74 | 98 | 92 |
| Fiber Tear at 60° C. (140° F.) | 20 | 58 | 96 | 78 |
| Fiber Tear at 65.6 (150° F.) | 20 | 62 | 72 | 54 |

Other embodiments are within the claims. All patents and references referred to herein are incorporated herein in their entirety to the extent they do not conflict.

What is claimed is:

1. A hot melt adhesive composition comprising:
at least 55% by weight of a first polymer consisting of a non functionalized amorphous poly alpha olefin polymer comprising greater than about 50% by weight polypropylene;
a second polymer selected from the group consisting of polypropylene homopolymers, propylene copolymers, and combinations thereof;
functionalized polypropylene wax; and
polyethylene wax;
the adhesive composition having a viscosity of no greater than 2000 centipoise at 176.7° C.

2. The adhesive composition of claim 1, wherein the non functionalized amorphous poly alpha olefin polymer has a viscosity of no greater than about 5,000 cps at 190° C.

3. The adhesive composition of claim 1, wherein the non functionalized amorphous poly alpha olefin polymer has a viscosity of no greater than about 750 cps at 190° C.

4. The adhesive composition of claim 1, wherein the non functionalized amorphous poly alpha olefin polymer comprises from about 60% by weight to about 85% by weight of the adhesive composition.

5. The adhesive composition of claim 1, wherein the non functionalized amorphous poly alpha olefin polymer has a polydispersity of no less than about 4.

6. The adhesive composition of claim 1, wherein the non functionalized amorphous poly alpha olefin polymer has a Mw of no greater than or equal to about 30,000.

7. The adhesive composition of claim 1, wherein the second polymer is metallocene catalyzed.

8. The adhesive composition of claim 1, wherein the second polymer has a polydispersity no greater than about 3.

9. The adhesive composition of claim 1, wherein the polyethylene wax has a density of at least about 0.92.

10. The adhesive composition of claim 1, wherein the functionalized polypropylene wax consists of maleic anhydride functionalized polypropylene wax.

11. The adhesive composition of claim 1 wherein the composition is free of a tackifying agent.

12. The adhesive composition of claim 1 additionally comprising a tackifying agent at no greater than about 15% by weight.

13. The adhesive composition of claim 1, wherein the composition exhibits at least 50% fiber tear at −20° F. and at 150° F.

14. A hot melt adhesive composition comprising:
   at least about 60% by weight of a first polymer consisting of a non functionalized amorphous poly alpha olefin polymer comprising greater than 55% by weight polypropylene having a viscosity at 190° C. of not more than 1500 cps;
   a second polymer selected from the group consisting of polypropylene homopolymers, propylene copolymers, and combinations thereof;
   functionalized wax; and
   a second wax.

15. The composition of claim 14 wherein the second polymer has a polydispersity of no greater than about 3.

16. The composition of claim 14 wherein the functionalized wax is a polyethylene wax.

17. The composition of claim 14 wherein the functionalized wax is a maleated wax.

18. A method of making a construction, the method comprising:
   Applying a hot melt adhesive composition comprising:
      at least 55% by weight of a first polymer consisting of a non functionalized amorphous poly alpha olefin polymer comprising greater than about 50% by weight polypropylene;
      a second polymer selected from the group consisting of polypropylene homopolymers, propylene copolymers, and combinations thereof;
      functionalized polypropylene wax; and
      polyethylene wax;
   on a surface of a first substrate; and
   contacting the applied adhesive composition with a second substrate
   such that the first substrate is bonded to the second through the adhesive composition and the adhesive composition exhibits at least 60% fiber tear at −20° F.

19. The method of claim 18, wherein at least one of the first and second substrates comprise at least one of paperboard, corrugated paperboard, cardboard, and coated cardboard.

20. A packaging construction made by the method of claim 18, the packaging construction being in a form selected from the group consisting of bag, box, carton, case and tray.

* * * * *